United States Patent [19]
Patel

[11] Patent Number: 5,356,716
[45] Date of Patent: Oct. 18, 1994

[54] WATERPROOFING SEALER/REPELLENT COMPOSITIONS FOR CONCRETE, MASONRY AND POROUS SURFACES

[76] Inventor: Pratim R. Patel, 404-201 Benner Rd., Allentown, Pa. 18104

[21] Appl. No.: 941,377

[22] Filed: Sep. 4, 1992

[51] Int. Cl.$^5$ .................. B32B 27/40; C08L 75/00
[52] U.S. Cl. .................. 428/423.1; 524/262; 524/265; 524/442; 524/730; 524/591; 524/791; 524/839; 524/871; 106/2; 523/122
[58] Field of Search ............... 524/269, 265, 591, 871, 524/839, 791, 730, 442, 262; 523/122; 428/423.1; 106/2

[56] References Cited

U.S. PATENT DOCUMENTS

| | | | |
|---|---|---|---|
| 3,726,825 | 4/1973 | Woodward | 524/591 |
| 3,772,065 | 11/1973 | Seiler | 106/2 |
| 3,819,400 | 6/1974 | Plankl et al. | 117/54 |
| 3,879,206 | 4/1975 | Nestler et al. | 106/12 |
| 3,980,597 | 9/1976 | Shihadeh | 260/28 R |
| 4,341,560 | 7/1982 | Saito et al. | 524/5 |
| 4,536,534 | 5/1985 | Singer et al. | 524/269 |
| 4,814,407 | 3/1989 | Canova et al. | 528/21 |
| 4,816,506 | 3/1989 | Gamon et al. | 524/265 |
| 4,894,405 | 1/1990 | Barron | 524/265 |
| 4,897,291 | 1/1990 | Kim | 524/588 |

Primary Examiner—Ralph H. Dean

[57] ABSTRACT

The present invention relates to waterproofing sealer compositions that protect various types of porous substrates from deterioration due to water absorption and thus extend their useful lives. Example of porous substrate are concrete, brick, masonry, ceramics, stones, cloth, wood and the like. These waterbased compositions comprise alkali metalalkylsiliconates, alkali silicates, polymers, diluents and additives.

These sealer compositions do not change appearance and character of the substrate surface.

14 Claims, No Drawings

WATERPROOFING SEALER/REPELLENT COMPOSITIONS FOR CONCRETE, MASONRY AND POROUS SURFACES

BACKGROUND OF THE INVENTION

1. Field of Invention

When surfaces such as concrete, brick, masonry, stone, etc. are applied with waterproofing sealer compositions, they get overall protection from corrosion and general deterioration. The treatment reduces the rate of water absorption considerably, thereby preventing water related damages. There are many sealers/repellents known to the prior art. For example, acrylics, vinyls, silanes, silicones, polyurethanes, styrene-butadiene copolymers, silicates, siloxanes, siliconates etc. They are either water based or solvent based or water-solvent based.

Due to fire hazard and environmental risks associated with many known solvents, it is advantageous to use effective water based waterproofing compositions. Waterproofing sealer/repellents based on =Si= chemistry play a significant role in the field of waterproofing materials. There are three popular groups of silicone based materials being used as waterproofing materials namely 1. silicates, 2. silane, siloxane, siliconate and 3. silicones.

Silicates provide waterproofing properties by filling the pore structure of building materials with silicone dioxide precipitation.

Silanes, siloxanes and siliconates provide waterproofing properties by bonding with the substrate and thus offer a long lasting solution.

Silicones are present in the polymer form and they do not form chemical bonds with the substrate. They provide waterproofing properties by forming a non-bonded film.

2. Prior Art

Representative references which illustrate some of the prior art waterproofing compositions are described in the following U.S. Patents:

U.S. Pat. No. 3,772,065 to Seiler relates to alkyltrialkoxysilane solution in alcohol having up to two alkoxygroups per silicone atom for masonry applications.

U.S. Pat. No. 3,819,400 to Plankl et al. relates to a waterproofing material treated with a silane or a siloxane.

U.S. Pat. No. 3,879,206 to Nestler et al. relates to formulation containing alkyltrialkoxysilane and an organo functional silane for masonry applications.

U.S. Pat. No. 3,980,597 to Shihadeh relates to a composition containing polyurethane and neutralised bituminous material for roof waterproofing applications.

U.S. Pat. No. 4,341,560 to Saito et al. relates to a composition containing alkaline metal alkylsilioonates or phenylsiliconates along with calcium hydroxide or calcium oxide to waterproof gypsum.

U.S. Pat. No. 4,536,534 to Singer et al. relates to an aqueous primer based on alkali soluble acrylic resins and siliconates for application on strong alkaline substrate to bring about good water repellance and binding.

U.S. Pat. No. 4,814,407 to Canova et al. relates to a composition of an alkylalkoxysilane or a fluoroalkylalkoxysilane for improving resistance to absorption of water by a porous substrate.

U.S. Pat. No. 4,816,506 to Gamon et al. relates to an aqueous silicone dispersions containing polydiorganosiloxanes, organometallic compounds, siliconate and optionally a silicone resin for elastomeric coating or sealant applications.

U.S. Pat. No. 4,894,405 to Barron relates to a composition containing polyurethane and organosilane for concrete and masonry waterproofing applications.

U.S. Pat. No. 4,897,291 to Kim relates to a sealant composition containing polymeric binder, a wax hydrophobic filler and a water soluble alkalimetalsiliconate salt for sealing wood products against moisture absorption.

Siliconates are water soluble and they impart water repellency on porous surfaces. As per the conventional method of application, 30% by weight of siliconate solution is diluted to less than about 3% by weight. Dilution reduces solution viscosity and increases its penetration along the depth of the substrate.

However, there is a drawback in using diluted alkalimetal alkyl siliconate solution for waterproofing applications. When this solution is applied by brush/spray/roller to the substrate, siliconates react with carbon dioxide and carbonatious matters present in the substrate to form a water repellent, water-insoluble, white colored precipitate. This white layer may become quite visible;

1. on surfaces applied with excess waterproofing solution,
2. on less porous surfaces, and
3. on surfaces that require preservation of their external appearance and character e.g. facades, decorative tiles, colored stones etc.

Such a change in discoloration and appearance of the substrate after curing of siliconate waterproofing solution is generally not acceptable from the aesthetic point of view.

Less than 1% by weight of siliconate solution minimizes formation of white residue to some extent but it gives a very poor waterproofing property.

The object of the invention is to overcome this drawback.

SUMMARY OF THE INVENTION

This and other objects of the invention are accomplished by the novel waterproofing sealer composition for application to concrete, masonry, cloth and many other porous surfaces.

The waterproofing sealer composition (100 parts by weight) comprises;

about 1 to 3 parts by wt. of water soluble alkalimetal-alkyl siliconates
 about 0.2 to 10 parts by wt. of polymers(resins)
 about 0 to 0.5 parts by wt. of alkali silicates
 about 0.005 to 2 parts by wt. of additives
 about 0 to 20 parts by wt. of diluents
 the balance parts by wt. of water A preferred waterproofing sealer composition comprises;

about 1.4 to 1.9 parts by wt. of water soluble alkali-alkyl siliconates
 about 1 to 3.5 parts by wt. of polymers
 about 0.001 to 0.2 parts by wt. of alkali silicates
 about 0.005 to 2.0 parts by wt. of additives
 about 0 to 5 parts by wt. of diluents
 the balance parts by wt. of water The waterproofing composition is applied to porous, clean surfaces such as concrete, masonry, brick, wood, stones, tiles, cloth etc. by brush, roller, spray, dipping or the like. Treated surfaces are allowed to dry and cure.

The sealer composition penetrates deep inside the substrate and lines capillary walls with its active ingredients to bring about properties like hydrophobicity and resistance to water absorption.

Some of the advantages associated with this invention include:
- an ability to overcome the drawback related to the formation of a white precipitate on substrate surface.
- an ability to improve resistance to water absorption in porous surfaces such as concrete, brick, masonry, stones and others.

DETAILED DESCRIPTION OF THE INVENTION

Alkalimetal alkylsiliconates used can be sodium methylsiliconate, sodium ethylsiliconate, sodium propylsiliconate, potassium methylsiliconate, potassium ethylsiliconate and potassium propylsiliconate. These alkalimetal alkylsiliconates are used in an aqueous solution form. The amount of alkalimetal alkylsiliconates to be used is usually below 3 parts by weight per 100 parts by weight of waterproofing sealer. It is possible to use a single siliconate or a mixture of at least two or more of the above mentioned siliconates in the waterproofing sealer composition. Preferred amount of siliconates to be used is 1.4 to 1.9 parts by weight per 100 parts by weight of waterproofing sealer solution.

Examples of polymers in the form of emulsions/dispersions are polyurethanes, alkali stable acrylic resins, vinyls and their copolymers. Preferred polymer emulsion/dispersions are of polyurethanes. A single or a mixture of two or more of the above mentioned polymer emulsions/dispersions may be used in the formulation. Amount of parts by weight of total polymer (solid content present in emulsions/dispersions) to be used in formulation is 0.20 to 10 parts/100 parts by weight of waterproofing sealer solution. The preferred amount of parts by weight of polymer to be used in formulation is 1.0 to 3.5 parts/100 parts by weight of waterproofing sealer solution.

Polyurethane dispersions/emulsions are made from aliphatic and aromatic diisocyanates, polyisocyanates, polyols and co-solvents. Example of diisocyanates are toluene diisocyanate(TDI), diphenylmethane 4,4'-diisocyanate (MDI), hexamethylene diisocyanate(HDI), isophorone diisocyanate(IPDI). Polyisooyanates can be based on TDI, MDI and IPDI. Examples of polyols are polyethers, polyesters, acrylic based polyols, polycarbonate based polyols and the like. Examples of co-solvents are hydrocarbon solvents such as toluene; N-methyl-2-pyrrolidone, dimethyl formamide(DMF) and the like.

Examples of alkali silicates are sodium silicate and potassium silicate. A preferred silicate is sodium silicate represented by the formula $Na_2O \cdot xSiO_2$ where $3.2 < x > 2.0$.

The preferred amount of a silicate to be used is 0.001 to 1.0 parts by weight per 100 parts by weight of the waterproofing sealer.

Examples of diluents are ethylene glycol, diethylene glycol, methanol, ethanol, n-propanol, iso-propanol, n-butanol and iso-butanol. One or a mixture of two or more of the above diluents can be used. The preferred amount of diluents to be used is 0 to 5 parts by weight per 100 parts by weight of the waterproofing sealer.

Examples of additives are surfactants, wetting agents, defoamers, biocides and the like. The preferred amount of each of these additives to be used is 0.005 to 2 parts by weight per 100 parts by weight of the waterproofing sealer.

Various other ingredients such as pigments, plasticizers, ultra violet inhibitors, antioxidants and the like can also be utilised in the conventional amount.

EXAMPLE 1

METHOD OF PREPARATION

The above mentioned chemical ingredients form a representative waterproofing composition which will be better understood by the following synthesis.

A typical method of preparation involves two steps:

Step 1: A waterproofing sealer composition of the invention is prepared by using a high speed mixer, preferably with variable speed control. One half of the weight of water is first mixed with preweighed quantity of selected polymer emulsion/dispersion for 10 minutes. Sodium silicate is then added in a 35% solution form and the mixture is stirred for 5 more minutes.

Step 2: Concentrated solution of a siliconate or mixtures of siliconates (30% concentration) is mixed with the other half of water for 5 to7 minutes. To this, the mixture prepared in step 1 is added gradually and it is further mixed for 5 to 10 minutes. Finally the additives are added to the solution under constant stirring for 5 minutes.

A typical formulation and its characteristics are given below in Table 1.

TABLE 1

| Formulation: | By wt. |
| --- | --- |
| Polyurethane dispersion grade 140AQ ®, Miles | 5 parts |
| Sodium methyl siliconate, Grade 772 Dow Corning ® or Grade R-20 Union Carbide ® | 5 parts |
| Sodium silicate, Grade N ® PQ Corp. | 0.1 parts |
| Surfactant, Surfynol TG ®, Air Products | 0.15 parts |
| Demineralized water | 89.75 parts |
|  | 100.00 parts |
| Charactericstics: | |
| Appearance | milky water solution |
| Cured substrate appearance | unchanged |
| density lbs/gallon(US) | 8.55 |
| Viscosity, cps | 20–40, waterlike |
| Flammability | non-flammable |

EXAMPLE 2

To illustrate the effectiveness of the waterproofing sealer composition of the invention a water absorption test is carried out. The following waterproofing formulations are prepared.

Formulation A: as in Example 1

Formulation B: 1.5% sodium methylsiliconate water solution. (by wt.)

Two pre-weighed masonry bricks of the size 4"×2"×0.5" are immersed fully in the formulation A and B respectively for 10 seconds. They are allowed to cure at 25° C. and relative humidity of 50–55% for 24 hours.

After the curing period, these two marked bricks are dipped into 0.75" of constant level water for 24 hours in such a way that 4"×0.5" side acts as a base and 2" side becomes height.

An increase in the weight of each brick is recorded. This is a weight gain after 24 hours.

These two bricks are immediately dipped again in the same orientation for another 144 hours. At the end of 168 hours, bricks are removed and an increase in weight is recorded. This is a weight gain after 168 hours. For the purpose of comparison, a third brick of same dimension is dipped in 0.75" constant water. Readings at 24 hours and 168 hours are taken for an increase in weight. The results obtained are shown in Table 2.

TABLE 2

|  | Formulation A | Formulation B | 100% water |
| --- | --- | --- | --- |
| Wt. of brick | 6.0 | 5.30 | 5.40 |
| Wt. of brick after 24 hrs. | 6.0 | 5.32 | 5.65 |
| Wt. of brick after 168 hrs. | 6.01 | 5.32 | 5.70 |
| % water absorbed in 24 hrs. | 0 | 0.37 | 4.63 |
| % water absorbed in 168 hrs. | 0.16 | 0.37 | 5.55 |

All weights are measured in ounce.

Formulation A representing the waterproofing sealer of the invention shows improved resistance to water absorption over formulation B of the prior art.

Untreated brick absorbs water to its maximum.

EXAMPLE 3

The following example gives comparison in appearance of the substrate, once the waterproofing sealers are cured. Formulations A and B described in Example 2 are coated one by one with a brush on a transparent acrylic sheet having dimension of 4'×4"×0.125". Thickness of application is approximately 0.01 inch. Formulations A and B are not absorbed by the non-porous surface of acrylic sheet. Thus it is easy to observe the characteristics of cured residues A and B respectively. These coatings are allowed to cure with carbon dioxide from air for 72 hours and the following visible observations are noted in Table 3.

TABLE 3

| Waterproofing sealer | Visible appearance after 72 hours | Visible appearance after 30 days |
| --- | --- | --- |
| Formulation A | semi-transparent film with no loose powdery residue | transluscent film |
| Formulation B | White flaky and powdery precipitate | white flaky and powdery precipitate |

The result indicate that waterproofing sealer composition of the Example 1 forms a fill that reins semi-transparent to transluscent and shows no loose powdery residue. This is a clear improvement over the prior art represented by the formulation B.

EXAMPLE 4

This example shows that the waterproofing sealer composition of the invention offers good resistance to efflorescence. To prove this a 2" size of concrete cube is coated with the waterproofing sealer composition of Example 1 on five sides at the rate of 85 square feet per gallon(US) by using a small brush.

The cube is allowed to dry and air cure for 24 hours. It is then kept in a 10% sodium sulfate solution of 0.25 inch constant level for 7 days with the uncoated side fully dipped. An untreated cube is also kept in the solution for the purpose of comparison.

At the end of 7th day, the following visible observation is made.

| Concrete cube(Untreated) | white residue of sodium sulfate is seen all over the exposed surfaces. |
| --- | --- |
| Concrete cube treated with formulation A | no white residue seen on the exposed surfaces. |

EXAMPLE 5

To perform vapour transmission test, a 2" of cement concrete cube is fully dipped in the waterproofing sealer composition of the invention (formulation A) for 10 seconds. It is next cured for 24 hours and weighed (weight X).

The cube is then dipped in a 6" of water for 7 days. It is removed, surface wiped and weighed again (weight Y).

The cube is next allowed to dry at a temperature of 25° C. and relative humidity of 50–55% for 24 hours. It is weighed (weight Z).

It is found that weight $Z=$ weight X.

This means that the amount of water absorbed evaporates out within 24 hours. This proves that the waterproofing sealer of the invention does not interfere with vapour transmission, an indicator of breathing property of the substrate.

The novel waterproofing sealer composition of Example 1 also exhibits the following characteristics;

When it is applied on the substrate, water present in the formulation begins to evaporate. The rate of evaporation depends on ambient temperatures, relative humidity and the wind velocity. As water concentration decreases, the dispersed/emulsified polymer begins to coagulate, thus forming a thin polymer film.

This polymer film exhibits good abrasion resistance property and can give increased protection against rain and wind impact, thus extending the useful life of porous substrates.

Although the preceeding specific examples which utilize specific polymers, siliconates, silicates and other ingredients; it is understood that the disclosures are made herein through examples and that many changes may be made to the formulations without departing from the spirit and scope of the invention or the scope of the appended claims.

I claim:

1. A waterproofing sealer/repellent composition (100 parts by weight) that protects and extends the life of porous substrate selected from the group consisting of concrete, masonry, wood, cloth, leather, stone and clay products, comprising:
   a. about 0.2 to 10 parts by wt. of polyurethane dispersions/emulsions;
   b. about 1 to 3 parts by wt. of aqueous alkalimetal alkylsiliconates;
   c. about 0 to 0.5 parts by wt. of alkali silicates;
   d. about 0.005 to 2 parts by wt. of additives;
   e. about 0 to 20 parts by wt. of diluents used as antifreeze agents;
   f. the balance parts by wt. of demineralised water.

2. The waterproofing sealer/repellent composition of claim 1, wherein polyurethane dispersions/emulsions are selected from the group consisting of polyurethane water-bourne polymers.

3. The waterproofing sealer/repellent composition of claim 1, wherein aqueous alkalimetal alkylsiliconates are selected from the group consisting of sodium methyl siliconate, sodium ethyl siliconate, potassium ethyl siliconate and potassium propyl siliconate.

4. The waterproofing sealer/repellent composition of claim 1, wherein alkalimetal silicates are selected from the group consisting of sodium silicate and potassium silicate.

5. The waterproofing sealer/repellent composition of claim 1, wherein additives are selected from the group consisting of surfactants, defoamers, wetting agents and bio-cides.

6. The waterproofing sealer/repellent composition of claim 1, wherein diluents used as anti-freeze agents are selected from the group consisting of ethylene glycol, diethylene glycol, methanol, ethanol, n-propanol, iso-propanol, n-butanol and iso-butanol.

7. The waterproofing sealer/repellent composition of any one of claims 1 to 6, wherein:
   a. the polymer emulsion/dispersion is polyurethane and it is used in an amount of about 1 to 3.5 parts by wt. per 100 parts by wt. of waterproofing sealer/repellent;
   b. the alkalimetal alkylsiliconate is sodium methyl siliconate and it is used in an amount of about 1.4 to 1.9 parts by wt. per 100 parts by wt. of waterproofing sealer/repellent;
   c. the alkalisilicate is sodium silicate, represented by the formula $Na_2O \cdot xSiO_2$ where $3.2 < x > 2.0$, and it is used in an amount of about 0.001 to 0.2 parts by wt. per 100 parts by wt. of waterproofing sealer/repellent;
   d. the diluents used as antifreeze agents are selected from the group consisting of ethylene glycol and diethylene glycol and they are used in an amount of about 0 to 5 parts by wt. per 100 parts by wt. of waterproofing sealer/repellent.

8. A porous substrate selected from the group consisting of concrete, masonry, wood, cloth, leather, stone and clay, coated with the composition of claim 1.

9. A porous substrate selected from the group consisting of concrete, masonry, wood, cloth, leather, stone and clay, coated with the composition of claim 2.

10. A porous substrate selected from the group consisting of concrete, masonry, wood, cloth, leather, stone and clay, coated with the composition of claim 3.

11. A porous substrate selected from the group consisting of concrete, masonry, wood, cloth, leather, stone and clay, coated with the composition of claim 4.

12. A porous substrate selected from the group consisting of concrete, masonry, wood, cloth, leather, stone and clay, coated with the composition of claim 5.

13. A porous substrate selected from the group consisting of concrete, masonry, wood, cloth, leather, stone and clay, coated with the composition of claim 6.

14. A porous substrate selected from the group consisting of concrete, masonry, wood, cloth, leather, stone and clay, coated with the composition of claim 7.

* * * * *